J. M. PATRICK.
WIND DEFLECTOR FOR AUTOMOBILES.
APPLICATION FILED JAN. 11, 1909.
940,270.
Patented Nov. 16, 1909.
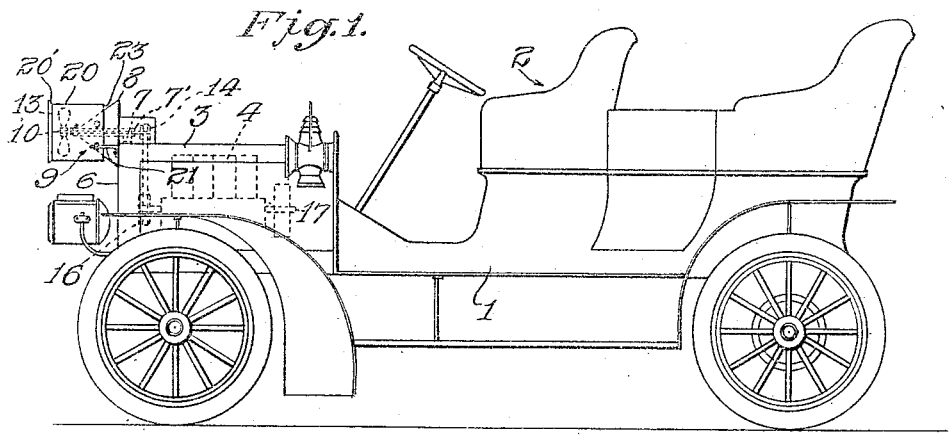
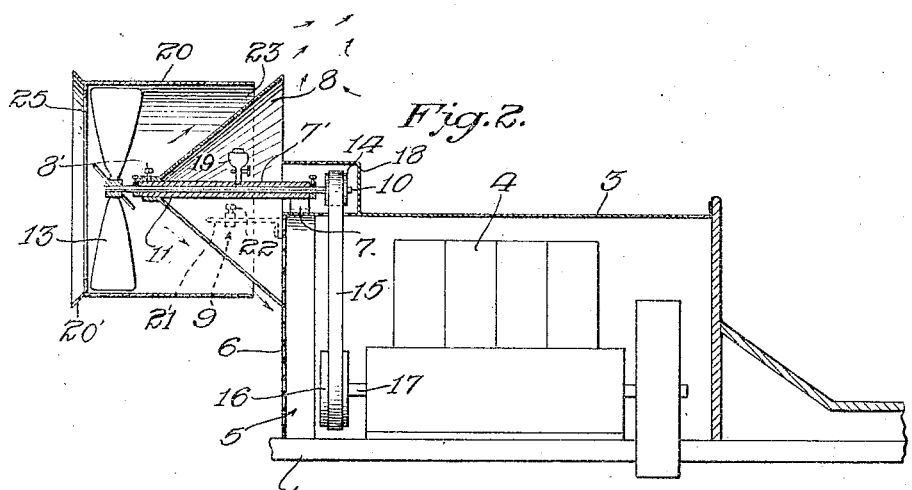
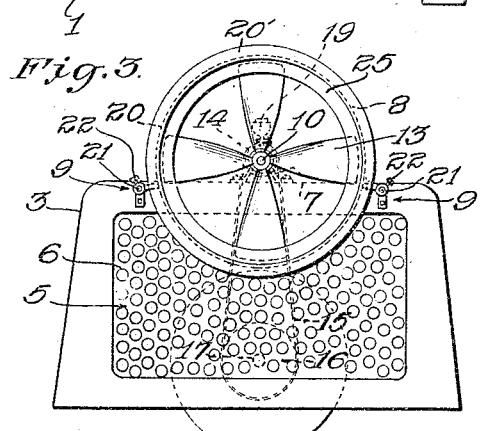
Witnesses:
C. F. Williams
Frank Ingraham
Inventor,
James M. Patrick
By Townsend Lyon & Headley
His Attys.

UNITED STATES PATENT OFFICE.

JAMES M. PATRICK, OF LOS ANGELES, CALIFORNIA.

WIND-DEFLECTOR FOR AUTOMOBILES.

940,270.  Specification of Letters Patent.  Patented Nov. 16, 1909.

Application filed January 11, 1909. Serial No. 471,806.

*To all whom it may concern:*

Be it known that I, JAMES M. PATRICK, a citizen of the United States, residing at Los Angeles, in the county of Los Angeles and State of California, have invented a new and useful Wind-Deflector for Automobiles and the Like, of which the following is a specification.

This invention relates to means for deflecting the air or wind at the front of the automobile so that it will not strike the operator with undue force. For this purpose glass fronts have generally been used which are open to the objection that they are dangerous in case of collision and that they interfere to some extent with clearness of vision and retard the speed of the machine.

The main object of the present invention is to provide a device for the above purpose which will overcome the rearward draft or wind with minimum expenditure of power and in the most effectual manner.

A further object of the invention is to provide for utilizing the current produced by the wind deflector in cooling the radiator of the automobile.

Another object of the invention is to reduce the amount of dust raised by the automobile.

Other objects of the invention will appear hereinafter.

The accompanying drawings illustrate the invention.

Figure 1 is a side elevation of the automobile provided with the invention. Fig. 2 is a vertical section of the deflector and adjacent portion to the hood. Fig. 3 is a front elevation of the deflector and hood.

1 designates the frame of an automobile, 2 the seat for the operator or chauffeur, and 3 the hood in which is inclosed the engine 4 and radiator 5, the hood having a perforate front 6 through which air can pass to the radiator. The deflector comprises a cone 8 supported at the front of the hood 3 with its apex pointed directly forward and its base located, for example, substantially in or near the plane of the front of the hood, said cone being fastened to the hood by any suitable means 9. The cone is preferably adjustable longitudinally of its axis, being fastened by set screw 8' on a sleeve 7' extending from a bracket 7 on the hood. Extending axially through the cone is a shaft 10 mounted to rotate in bearing 11, said shaft carrying a fan 13 and being connected to be driven in any suitable manner by the automobile engine 4. For this purpose said shaft may carry a pulley 14 connected by a belt 15 with a pulley 16 on a shaft 17 of engine 5. A casing 18 may extend over the pulley 14 to protect it from the weather. A lubricator 19 is provided for bearing 11. A tubular or cylindrical case or shell 20 extends co-axially with cone 8 and is supported, for example, by studs 21 on which it is fastened adjustably by set screws 22. Said case serves to concentrate the draft from the fan directly against the front of the cone, a slot or passage 23 being left between the rear end of this case and the cone, the width of this slot being adjustable by adjusting the position of case 20. By locating the wind deflector as stated the rearward draft therefrom at the lower portion of the cone is directed back into the front of the radiator so as to aid in cooling the radiator and the engine. Casing 20 may have a flaring flange 20' at its front and an inwardly extending flange 25 which prevents back draft from the frame.

The operation is as follows: When the automobile is running, the engine 5 being in operation, shaft 10 is driven at high speed, say from one to three thousand revolutions per minute, and the fan 13 is thereby caused to produce a rearward draft or current of air backwardly against the front of the cone 8, the casing 20 serving to concentrate the draft against the cone as stated. On striking the cone the current of air is deflected obliquely outward and as it passes the rear edge or lip of the cone it produces lateral suction, by reason of its velocity, tending to draw the air forward from the space at the rear of the cone so that an eddy is set up as indicated by dotted lines in Fig. 2. This outwardly directed current of air acts as a conical protecting sheet extending for a considerable distance to the rearward of the cone and obliquely upward and sidewise, this sheet producing, in a space within and at the rear thereof, a condition of forward draft or suction, and by proper arrangement of the parts this forward suction can be made to substantially neutralize the natural back draft at the chauffeur's seat so that no uncomfortable wind will be felt by the operator. This rearward current, in so far as it passes down and back into the hood 3, tends to cool the radiator and the engine, thereby producing a double effect of the air current, As the automobile speeds up the effect of the natural back draft produced by the motion of the automobile on the fan 13 tends to rotate said fan in the same direction in which it is rotated by the engine so that there is no loss of power, the energy being supplied to the fan by the natural air or wind. The rearwardly passing sheet of air also reduces the amount of dust raised by the automobile, as it neutralizes the forward draft at the road surface in front and alongside of the machine.

The deflector 8 is not necessarily conical and it may be of any shape adapted to cause the rearward draft from the fan to be deflected outwardly.

What I claim is:

1. In an automobile, a wind deflector for the purpose stated comprising a cone at the front portion of the automobile and means for producing a rearward draft of air against the front of the cone, said cone being located to direct said draft above the front portion of the automobile.

2. In an automobile, a wind deflector for the purpose stated comprising a cone at the front portion of the automobile, and extending above the front portion of the automobile, a fan at the front of the cone, and means for rotating said fan.

3. In an automobile, a wind deflector for the purpose stated comprising a cone at the front portion of the automobile, a fan at the front of the cone, and means for rotating said fan, and a casing surrounding said fan and extending into proximity with said cone leaving a space between the rear end of the casing and the cone, said fan and casing extending above the front portion of the automobile to direct the draft from the fan and cone over the front portion of the automobile.

4. In combination with an automobile and its hood and the engine, a radiator located within the hood of the wind deflector at the front of the automobile and comprising a cone, a fan in front of the cone, and means for rotating said fan, said wind deflector being extended partly in front of the automobile and partly in front of the hood to project a diverging conical sheet of air over and obliquely outside of the hood and within the hood to neutralize the natural rearward draft at the front of the machine and to aid in cooling the radiator.

5. In an automobile, the combination of means for producing a rearward current of air at the front of the automobile, the discharge from said means extending upwardly and laterally over and at the sides of the front portion of the automobile, and a deflector at the rear of said means for deflecting said current of air upwardly and outwardly over and at the side of the front portion of the automobile and producing a forward suction directly at the rear of said deflector.

In testimony whereof, I have hereunto set my hand at Los Angeles, California, this 4th day of January 1909.

JAMES M. PATRICK.

In presence of—
P. H. SHELTON,
FREDERICK S. LYON.